June 3, 1958 G. E. KANTA 2,837,056
ANIMAL TRAINING DEVICE
Filed June 1, 1956
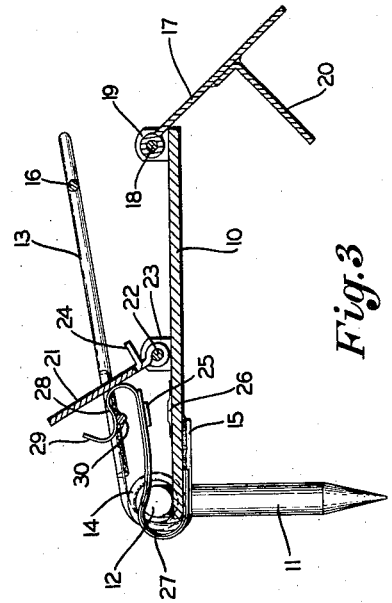
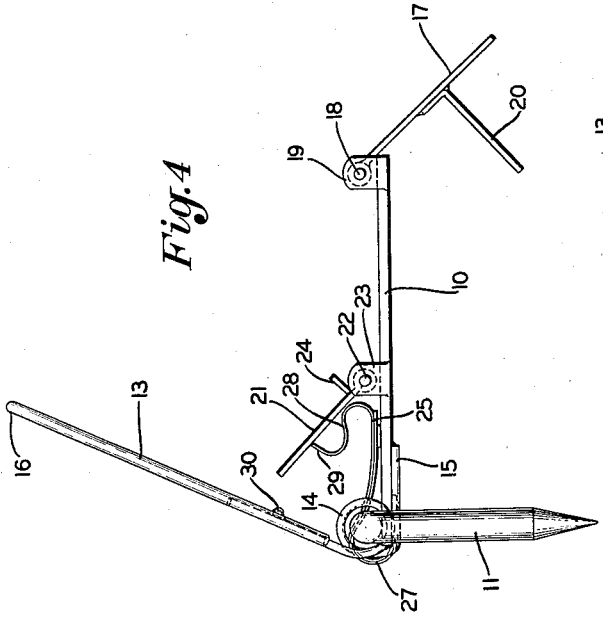
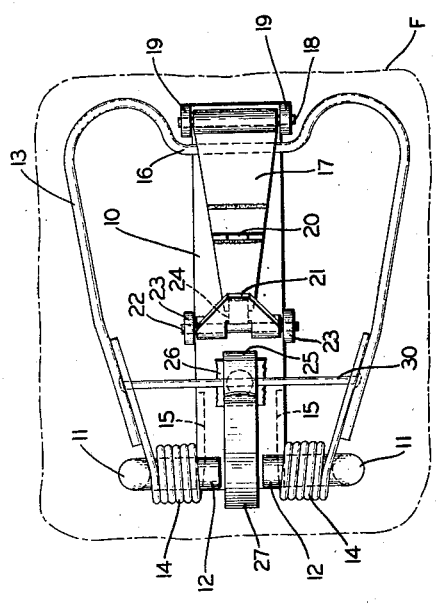
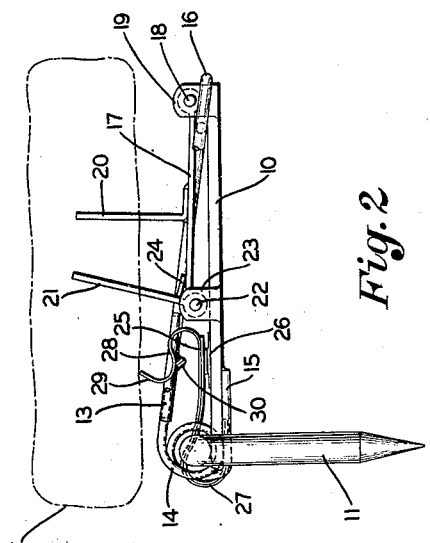
INVENTOR.
George E. Kanta
BY Frease & Bishop
ATTORNEYS United States Patent Office 2,837,056
Patented June 3, 1958

2,837,056
ANIMAL TRAINING DEVICE
George E. Kanta, Three Forks, Mont.

Application June 1, 1956, Serial No. 588,875

4 Claims. (Cl. 119—29)

The invention relates to devices for training animals, and more particularly to a device for training dogs, and other animals, not to pick up food outdoors.

Food scraps in garbage cans, or thrown outdoors, may have become poisonous because of spoilage, or may contain dangerous bone splinters. And in some cases, such food scraps may have been intentionally poisoned in order to exterminate rats or other vermin. In either event, it is well known that it is dangerous for dogs, or other pets, to eat such scraps of food found outdoors, or at any place other than the dish or container from which the animal is customarily fed.

The present invention contemplates means for breaking dogs or other animals, from eating any food scraps found outdoors, or at any place other than the animals own dish.

It is therefore an object of the invention to provide means for breaking dogs and other pets of the habit of eating any food except that given to them by their owners at a customary place.

Another object is to provide means for teaching a dog, or other animals, that it will be physically hurt when picking up food elsewhere than his own dish.

A further object is to provide a device for frightening the animal when picking up food outdoors or away from home.

A still further object is to provide such a device which will frighten the animal and at the same time cause it physical pain, as by striking it a sharp but noninjurious blow.

Another object of the invention is to provide a device of the character referred to which will frighten the animal as by making a sharp noise at the time of picking up food scraps outdoors.

A further object is to provide a device adapted to be concealed by a scrap of food, and having compression or tension operated means for striking the animal a sharp blow on the mouth or jaw when he attempts to remove the food scrap.

A still further object is to provide such a device with means for discharging an explosive when the food scrap is touched by an animal.

The above objects together with others which will be apparent from the drawing and following description, or which may be later referred to, may be attained by constructing the improved device in the manner shown in the drawing and hereinafter described in detail.

In general terms, the invention may be described as comprising a compression or tension operated means with trigger releasing means adapted to be held in set position by food scrap, so that slight movement of food scrap will release trigger and cause immediate operation of compression or tension operated means to strike animal a blow on mouth or jaw, or produce a sharp noise, such as an explosion, or both.

The device may include means for anchoring it to the ground, and may contain a spring or tension operated loop, for striking the animal a blow, with a spring-retaining link for holding the loop in set position and a trigger cooperating therewith and adapted to be held in cocked position by a scrap of food.

With such a device the food scrap should be large enough to conceal the entire device. In operation, when a dog or other animal grabs the food in its mouth, the trigger will be immediately released, releasing the spring link and permitting the compression or tension means to throw the loop up sharply into contact with the dog's mouth or jaw, causing it momentary pain but no bodily injury.

The device may include a firing hammer adapted to be released for exploding an explosive cap or the like, by release of the trigger, and, if desired, such firing hammer may be associated with the spring or tension-operated loop, whereby the animal may be struck by the loop and simultaneously frightened by an explosion.

Having thus described the invention briefly, reference is now made to the accompanying drawing showing a preferred embodiment of the invention, in which:

Fig. 1 is a top plan view of an animal training device, showing the same in the set position;

Fig. 2 is a side elevation of the device shown in Fig. 1;

Fig. 3 is a longitudinal sectional view through the device at the instant the trigger is released; and Fig. 4 is a side elevation showing the device in the operated position, with the compression or tension-operated loop in striking position and the hammer in firing position.

Reference is now made to the embodiment of the invention illustrated in the drawing, in which similar numerals refer to similar parts throughout the several views. This embodiment provides means for both hurting and frightening the animal at the time he picks up the food scrap with which the device is baited.

The device may include a base or main body portion in the form of the elongated flat bar 10, formed of metal, or other suitable material, and adapted to lay flat upon the ground. For the purpose of anchoring the device at any desired location upon the ground, a pair of depending stakes 11 are attached to the flat bar 10 and adapted to be inserted into the ground.

As shown in the drawing, each of these stakes may be of inverted L-shape, having an angular extension 12 at its upper end, welded to one end of the base or body member 10, at each side thereof.

For the purpose of striking the animal a sharp blow upon the mouth or jaw, a spring-loaded loop 13 is pivotally connected to the base or body of the device. Coil springs 14 may be formed upon or attached to the open ends of the loop 13, and are shown as coiled around the angular extensions 12 of the anchoring stakes, the ends of said coils being welded or otherwise attached to the base 10 as indicated at 15.

The loop 13 extends longitudinally of the device, and the closed end 16 thereof is adapted to be engaged by the spring-retaining link 17. This link is pivoted at 18 to the ears 19, formed on opposite side edges of the bar 10, at the end opposite from the anchoring stakes 11. An upright tapered finger 20 is formed upon the link 17, intermediate its ends.

A trigger 21 is pivoted at 22 upon the ears 23 located at opposite edges of the bar 10, intermediate the ends thereof, and the trigger is provided with an angular lug 24 adapted to engage the end of the spring-retaining link 17, when the device is set, as shown in Figs. 1 and 2.

In order to set the device, the spring loop 13 is pressed down upon the bar 10, the spring retaining link 17 is swung down upon the closed end 16 of the loop, and the lug 24 of the trigger is engaged over the end of the link 17, as shown in Figs. 1 and 2.

A scrap of food, as indicated in broken lines at F in

Figs. 1 and 2, is placed over the top of the device, engaging the trigger 21 and the angular finger 20 of the retaining link 17, and holding the same in upright position. As shown in Fig. 1, the food scrap should be large enough to entirely conceal the device.

When the food scrap is removed by a dog, the spring loaded loop 13 will force the retaining link 17 upward, throwing the trigger backward and releasing the loop 13, permitting it to fly upward and strike the dog sharply on the mouth or jaw, so as to hurt the dog without causing any permanent injury.

If it is desired to frighten the dog, means may be provided upon the training device for producing an effect which would be disagreeable or frightening to an animal, such as releasing a pungent spray, or creating a loud noise.

In the present case means is shown for creating a frightening noise by firing an explosive when the trigger is released by removal of the food scrap. For this purpose, a firing hammer 25 is provided for exploding a cap 26 or other suitable explosive, which may be placed upon the top of the bar 10, which serves as an anvil for the hammer to strike against.

The hammer 25 is shown in the form of a spring-actuated hammer, provided with the arcuate spring portion 27 connecting the hammer to the adjacent end portion of the bar 10, and normally urging the hammer downward into contact with the anvil or bar 10.

For the purpose of lifting the hammer when the trigger is released, the hammer has its free end bent into U-shape as shown at 28, terminating in the upwardly curved end 29. A cross bar 30 is provided across the spring loop 13, near the pivoted end thereof, for engagement with the U-shape portion 28 of the hammer.

With this construction, it will be seen that when the device is set, as shown in Figs. 1 and 2, the cross bar 30 will be engaged against the top side of the U-shape bend 28 of the hammer. When the trigger is released, as shown in Fig. 3, the spring loop 13 will start to move upward, and the cross bar 30 thereof will raise the hammer 25 therewith to a substantial distance above the anvil or bar 10.

Upon continued upward movement of the spring loop 13, the curved terminal end 29 of the hammer 25 will ride off of the cross bar 30 and the spring hammer will rebound against the cap or other explosive object 26, exploding the same substantially in the face of the dog.

At the same time, as the hammer is brought down to firing position, as shown in Fig. 4, the spring loop 13 will swing up to its uppermost position, as also shown in Fig. 4, striking the dog a sharp blow on the mouth or jaw, depending of course upon the position of the dog relative to the training device, at the instant of removing the food scrap.

Thus it will be seen that with the construction illustrated and described, the dog may be struck and at the same time frightened, as by an explosion or other noise. Or, if desired, either the striking means, or the frightening means may be eliminated from the device, so that the dog may be either frightened or struck as it removes the food scrap from the training device.

It should be understood that the embodiment of the invention illustrated in the accompanying drawing and above described, is disclosed by way of illustration only, and that it is not the intention to limit the invention to the specific construction thereof.

The principal object is to teach the animal that it will be hurt or frightened, or both, whenever it picks up food elsewhere than from its own dish. By placing a number of these training devices at various points in the yard or other enclosure in which the dog is confined, it will soon learn that picking up food scraps outside is an unpleasant experience and it will soon be cured of eating anywhere other than from its own dish.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. An animal training device comprising a horizontal body member, a spring-loaded loop pivotally attached at one end to one end of the body member and normally urged to an upright position, a retaining link pivotally mounted upon the other end of the body member for engaging over the free end of said loop for holding the loop folded against the body member, a tapered upright finger upon said retaining link, a trigger pivotally mounted upon the body member between the retaining link and the pivotal point of said loop, said trigger comprising an angular lug for releasably engaging the free end of the retaining link, and a tapered upright finger upon the trigger cooperating with the tapered finger upon the retaining link for holding food scraps in position to be taken by an animal, whereby when an animal removes the food scraps from said tapered fingers the trigger will release the retaining link permitting the spring-loaded loop to swing upward striking the animal a sharp blow.

2. An animal training device comprising a horizontal body member, a spring-loaded loop pivotally attached at one end to one end of the body member and normally urged to an upright position, a cross bar upon said loop intermediate the ends thereof, a spring-actuated firing hammer in the form of a spring attached at one end to the body member and normally urged into contact with the body member, means for positioning an explosive cap upon the body member beneath said firing hammer, the free end of said spring firing hammer being bent upwardly and rearwardly in U-shape, and terminating in an upwardly curved end for releasably engaging said cross bar, a retaining link pivotally mounted upon the other end of the body member for engaging over the free end of said loop for holding the loop folded against the body member, a tapered upright finger upon said retaining link, a trigger pivotally mounted upon the body member between the retaining link and the pivotal point of said loop, said trigger comprising an angular lug for releasably engaging the free end of the retaining link, and a tapered upright finger upon the trigger cooperating with the tapered finger upon the retaining link for holding food scraps in position to be taken by an animal, whereby when an animal removes the food scraps from said tapered fingers, the trigger will release the retaining link permitting the spring-loaded loop to swing upward striking the animal a sharp blow, and releasing the spring-actuated firing hammer causing it to strike the explosive cap.

3. An animal training device comprising a horizontal body member, depending anchoring stakes upon the body member for engagement in the ground, a spring-loaded loop pivotally attached at one end to one end of the body member and normally urged to an upright position, a retaining link pivotally mounted upon the other end of the body member for engaging over the free end of said loop for holding the loop folded against the body member, a tapered upright finger upon said retaining link, a trigger pivotally mounted upon the body member between the retaining link and the pivotal point of said loop, said trigger comprising an angular lug for releasably engaging the free end of the retaining link, and a tapered upright finger upon the trigger cooperating with the tapered finger upon the retaining link for holding food scraps in position to be taken by an animal, whereby when an animal removes the food scraps from said tapered fingers the trigger will release the retaining link permitting the spring-loaded loop to swing upward striking the animal a sharp blow.

4. An animal training device comprising a horizontal body member, depending anchoring stakes upon the body member for engagement in the ground, a spring-loaded loop pivotally attached at one end to one end of the body member and normally urged to an upright position, a cross bar upon said loop intermediate the ends thereof, a spring-actuated firing hammer in the form of a spring attached at one end to the body member and normally urged into contact with the body member, means for positioning an explosive cap upon the body member beneath said firing hammer, the free end of said spring firing hammer being bent upwardly and rearwardly in U-shape end terminating in an upwardly curved end for releasably engaging said cross bar, a retaining link pivotally mounted upon the other end of the body member for engaging over the free end of said loop for holding the loop folded against the body member, a tapered upright finger upon said retaining link, a trigger pivotally mounted upon the body member between the retaining link and the pivotal point of said loop, said trigger comprising an angular lug for releasably engaging the free end of the retaining link, and a tapered upright finger upon the trigger cooperating with the tapered fingers upon the retaining link for holding food scraps in position to be taken by an animal, whereby when an animal removes the food scraps from said tapered fingers, the trigger will release the retaining link permitting the spring-loaded loop to swing upward striking the animal a sharp blow, and releasing the spring-actuated firing hammer causing it to strike the explosive cap.

References Cited in the file of this patent

UNITED STATES PATENTS

| | | |
|---|---|---|
| 571,773 | Leland | Nov. 24, 1896 |
| 1,791,172 | Suhr | Feb. 3, 1931 |
| 1,936,150 | Adams | Nov. 21, 1933 |
| 2,060,947 | Morrow | Nov. 17, 1936 |

FOREIGN PATENTS

| | | |
|---|---|---|
| 282,589 | Germany | of 1915 |